(12) United States Patent
Koreeda et al.

(10) Patent No.: US 7,241,057 B2
(45) Date of Patent: Jul. 10, 2007

(54) OPTICAL CONNECTOR APPARATUS HAVING A LIGHT SHIELDING DEVICE OF A SIMPLE STRUCTURE

(75) Inventors: Yuichi Koreeda, Tokyo (JP); Yoshiteru Abe, Kanagawa (JP); Masaru Kobayashi, Kanagawa (JP); Ryou Nagase, Tokyo (JP)

(73) Assignees: Japan Aviation Electronics Industry, Limited, Tokyo (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 11/365,077

(22) Filed: Mar. 1, 2006

(65) Prior Publication Data
US 2006/0210224 A1    Sep. 21, 2006

(30) Foreign Application Priority Data
Mar. 1, 2005    (JP) .............................. 2005-055660

(51) Int. Cl.
G02B 6/38    (2006.01)
(52) U.S. Cl. ............................ 385/75; 385/53; 385/70; 385/76; 385/77; 385/58; 385/139; 385/71
(58) Field of Classification Search ................. 385/53, 385/19, 58, 60, 75, 70, 71, 73, 76, 77, 78, 385/88, 89, 92, 94, 139
See application file for complete search history.

(56) References Cited

U.S. PATENT DOCUMENTS

| | | | | |
|---|---|---|---|---|
| 4,277,135 A * | 7/1981 | Schrott et al. ................. | 385/75 |
| 5,452,388 A * | 9/1995 | Rittle et al. .................... | 385/92 |
| 5,883,995 A * | 3/1999 | Lu ................................. | 385/60 |
| 6,206,577 B1 * | 3/2001 | Hall et al. ...................... | 385/53 |
| 6,461,054 B1 * | 10/2002 | Iwase ........................... | 385/73 |
| 2006/0147156 A1 * | 7/2006 | Tsuchida et al. ............... | 385/71 |
| 2006/0210224 A1 * | 9/2006 | Koreeda et al. ............... | 385/70 |

FOREIGN PATENT DOCUMENTS

WO    WO 98/53347    11/1998    ............... 385/60 X

\* cited by examiner

*Primary Examiner*—Brian M. Healy
(74) *Attorney, Agent, or Firm*—Collard & Roe, P.C.

(57) ABSTRACT

An optical connector apparatus includes a first and a second optical connector which are optically connectable to each other. The first optical connector includes a first connector body, a first light shielding device fitted to the first connector body in a first fitting direction, and a first guide portion coupled to the first light shielding device to guide fitting of the first light shielding device to the first connector body. The first guide portion has a first dimension in the first fitting direction. The second optical connector includes a second connector body, a second light shielding device fitted to the second connector body in a second fitting direction, and a second guide portion coupled to the second light shielding device to guide fitting of the second light shielding device to the second connector body. The second guide portion has a second dimension in the second fitting direction. In the optical connector, the second dimension is determined greater than the first dimension.

17 Claims, 5 Drawing Sheets

OPTICAL CONNECTOR APPARATUS HAVING A LIGHT SHIELDING DEVICE OF A SIMPLE STRUCTURE

This application claims priority to prior Japanese patent application JP 2005-55660, the disclosure of which is incorporated herein by reference.

BACKGROUND OF THE INVENTION

This invention relates to an optical connector apparatus for establishing optical connection and, in particular, to an optical connector apparatus having a light shielding device for shielding an optical path when optical connection is not established.

An optical connector apparatus of the type is disclosed in WO98/53347. The optical connector apparatus has a light shielding device carried on a housing of an optical connector element connected to an optical fiber. The light shielding device comprises a cover pivotable between an open position and a closed position. In the open position, the optical fiber connected to the optical connector element is exposed. In the closed position, the optical fiber is covered. Upon establishing connection, the optical connector element is inserted into an adapter. When the optical connector element is inserted into the adapter, the cover is urged by a cam pin towards the open position.

In the above-mentioned optical connector apparatus, the pivotable cover is urged by the cam pin towards the open position. Therefore, the light Lu shielding device inevitably has a complicated structure.

SUMMARY OF THE INVENTION

It is therefore an object of this invention to provide an optical connector apparatus having a light shielding device of a simple structure.

It is another object of this invention to provide an optical connector apparatus suppressed in occurrence of operation error in an assembling operation.

Other objects of the present invention will become clear as the description proceeds.

According to an aspect of the present invention, there is provided an optical connector apparatus comprising a first and a second optical connector which are optically connectable to each other. The first optical connector comprises a first connector body, a first light shielding device fitted to the first connector body in a first fitting direction, and a first guide portion coupled to the first light shielding device to guide fitting of the first light shielding device to the first connector body, the first guide portion having a first dimension in the first fitting direction. The second optical connector comprises a second connector body, a second light shielding device fitted to the second connector body in a second fitting direction, and a second guide portion coupled to the second light shielding device to guide fitting of the second light shielding device to the second connector body, the second guide portion having a second dimension in the second fitting direction. In the optical connector apparatus, the second dimension is determined greater than the first dimension.

According to another aspect of the present invention, there is provided an optical connector comprising a connector body having an opening portion which defines an axial direction and has a rectangular section and a light shielding device coupled to the connector body, the light shielding device comprising a light shielding device body inserted into the opening portion, a light shielding member engaged with the light shielding device body and movable in a radial direction perpendicular to the axial direction to open and close an optical path, and a guide portion coupled to the light shielding device body to be guided by the connector body, the connector body having a groove formed on an inner surface of the opening portion at a biased position in the radial direction to receive the guide portion.

DESCRIPTION OF THE PREFERRED EMBODIMENTS

Figure 1:
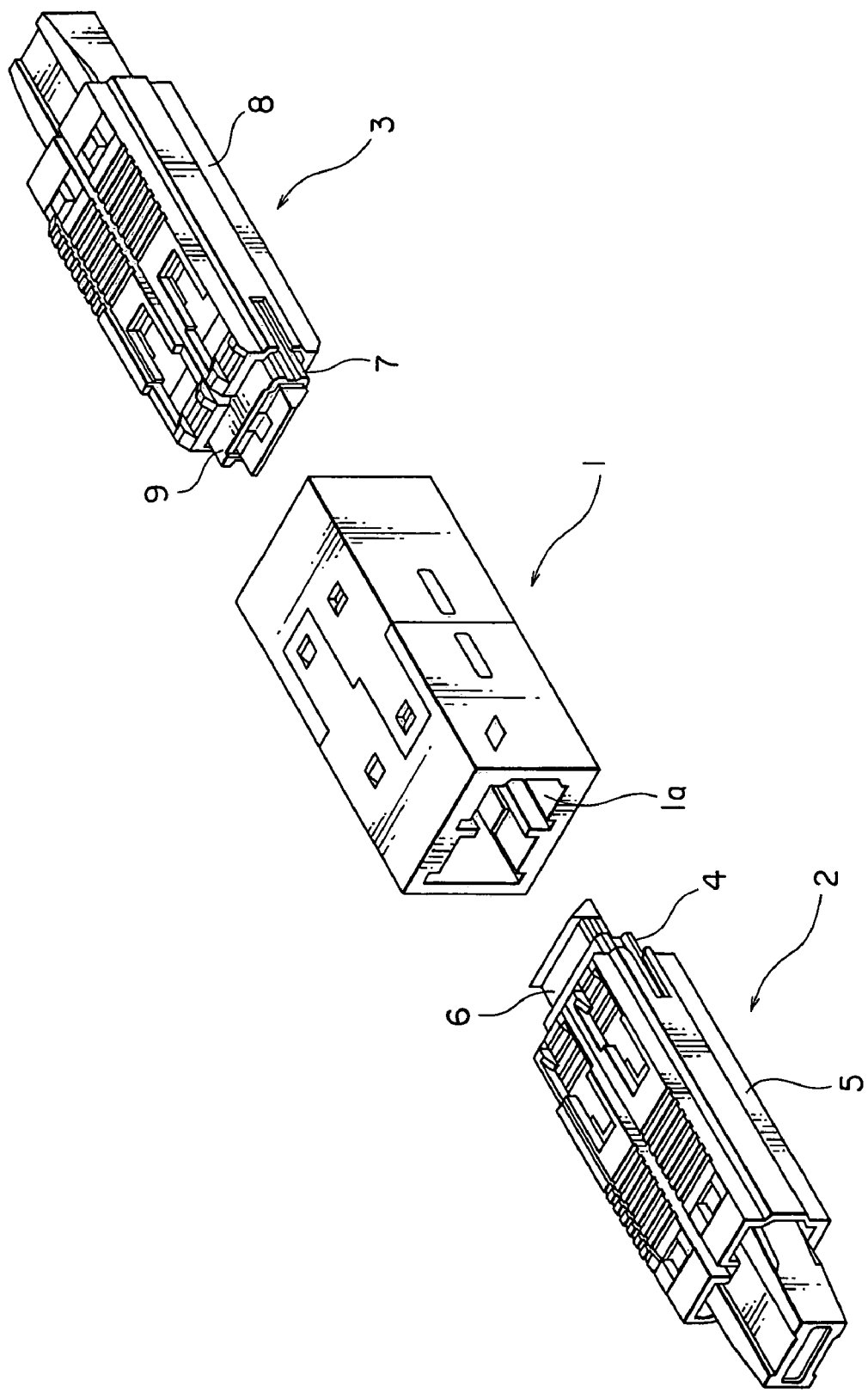
FIG. 1 is an exploded perspective view of an optical connector apparatus according to an embodiment of this invention.

Referring to FIG. 1, description will be made of an optical-connector apparatus according to an embodiment of this invention.

The optical connector apparatus illustrated in the figure is for establishing optical connection between a pair of optical fibers and comprises-a connecting adapter 1 of a tubular shape and two optical connectors, i.e., a jack 2 and a plug 3, inserted into a through hole 1 a of the connecting adapter 1 on both sides thereof. The jack 2 comprises a jack-side connector 4 and an armoring member 5 fitted over the jack-side connector 4. The jack-side connector 4 has a jack-side light shielding device 6 disposed at an end portion inserted into the connecting adapter 1.

The plug 3 comprises a plug-side connector 7 and an armoring member 8 fitted over the plug-side connector 7. The plug-side connector 7 has a plug-side light shielding device 9 disposed at an end portion inserted into the connecting adapter 1.

Figure 2A:
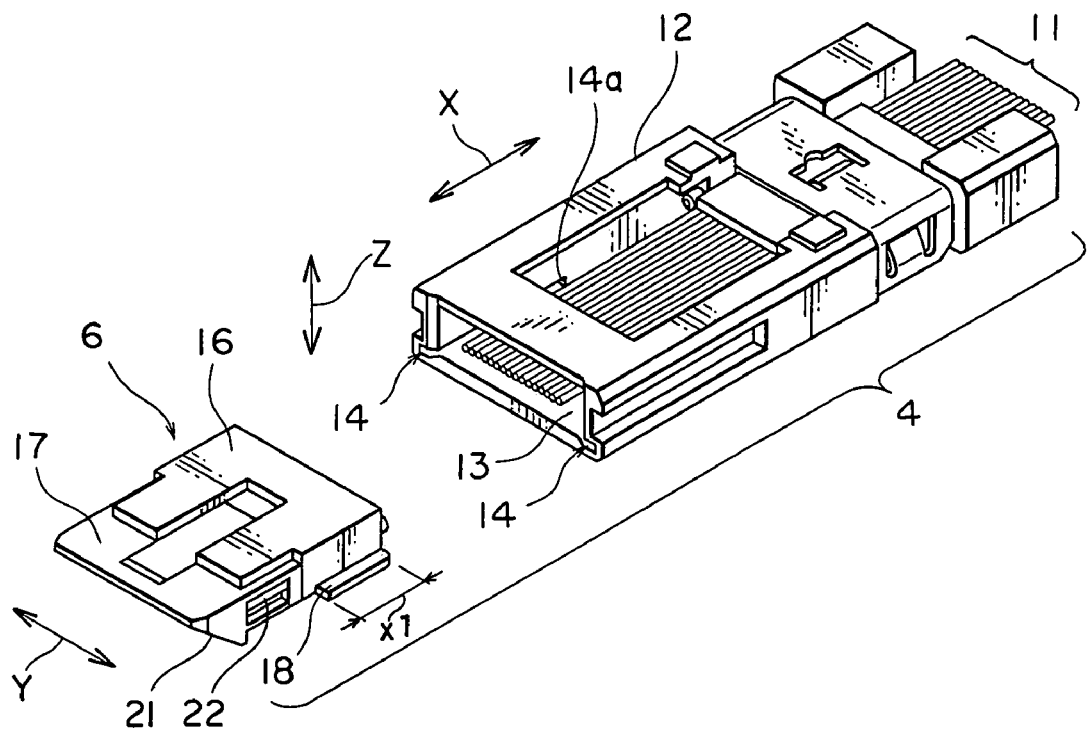
FIG. 2A is an exploded perspective view of a jack-side optical connector contained in the optical connector apparatus illustrated in FIG. 1.
Figure 2B:
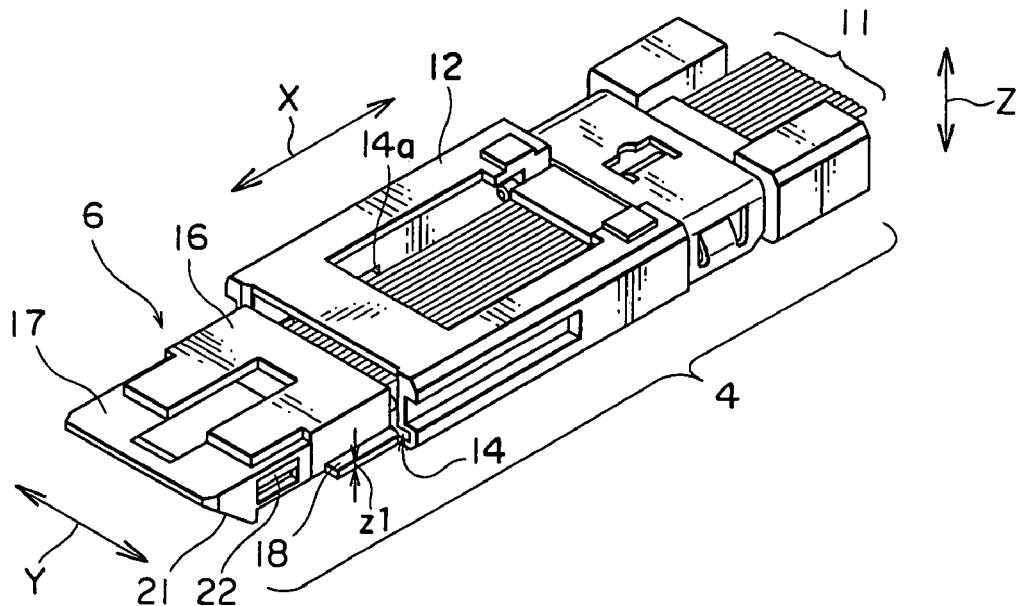
FIG. 2B is a perspective view showing a half-assembled state of the jack-side optical connector in FIG. 2A.

Referring to FIGS. 2A and 2B in addition to FIG. 1, the jack-side connector 4 will be described.

The jack-side connector 4 comprises a connector body 12 of a rectangular tubular shape. A number of optical fibers 11 as optical transmission lines are received in the connector body 12 in a parallel arrangement. The connector body 12 has an opening portion 13 having a rectangular section and formed at its one end in an axial direction X to receive the light shielding device 6. The connector body 12 has a pair of grooves or recesses 14 formed at opposite ends of the opening portion 13 in a widthwise direction Y, respectively. Each of the grooves 14 extends from the one end of the connector body 12 in the axial direction X at one end of the opening portion 13 in a thickness direction Z and is terminated at an intermediate position of the connector body 32 to form a licking portion 14a.

The jack-side light shielding device 6 comprises a light shielding device body 16 fitted and inserted into the opening portion 13 of the connector body 12 in the axial direction X (which is referred here to as a first coupling direction) and held so as to be movable only in the axial direction X, and a shutter or a light shielding member 17 held by the light shielding device body 16 so as to be slidable only in a radial direction, more particularly, the thickness direction Z. The light shielding device body 16 has a pair of rectangular protrusions 18 as guide portions formed at opposite ends in the widthwise direction Y, respectively, to be inserted into the grooves 14 in one-to-one correspondence. Each of the protrusions 18 has a large dimension in the axial direction X. By inserting the light shielding device body 16 into the opening portion 13 until the protrusions 18 are butted against the terminal ends of the grooves 14, the light shielding member 17 can be properly positioned. The light shielding member 17 is not excessively inserted into the connector body 12 even if it is pushed further.

The grooves 14 and the protrusions 18 are formed at positions biased to one side in the thickness direction Z. Therefore, orientation of the jack-side light shielding device 6 with respect to the connector body 12 is uniquely determined. Thus, the jack-side connector 4 can not be assembled if orientation of the jack-side light shielding device 6 with respect to the connector body 12 is improper. The light shielding device body 16 has an aligning mechanism which is for aligning the optical fibers 11 and other optical fibers in one-to-one correspondence.

In the axial direction X, the protrusion 18 has a dimension x1 corresponding to an approximate half of that of the groove 14. In the thickness direction Z, the protrusion 18 has a dimension z1 slightly smaller than that of the groove 14.

The light shielding member 17 has a slant surface 21 formed at its end in the axial direction X. The slant surface 21 is inclined to have predetermined angles with respect to the axial direction X and the thickness direction Z. Therefore, if a force in the axial direction X is applied to the slant surface 21 in the states illustrated in FIGS. 2A and 2B, the light shielding member 17 is moved in the thickness direction Z due to a component force thereof. A movable range of the light shielding member 17 is restricted by opposite protrusions 22 of the light shielding device body 16.

Figure 3A:
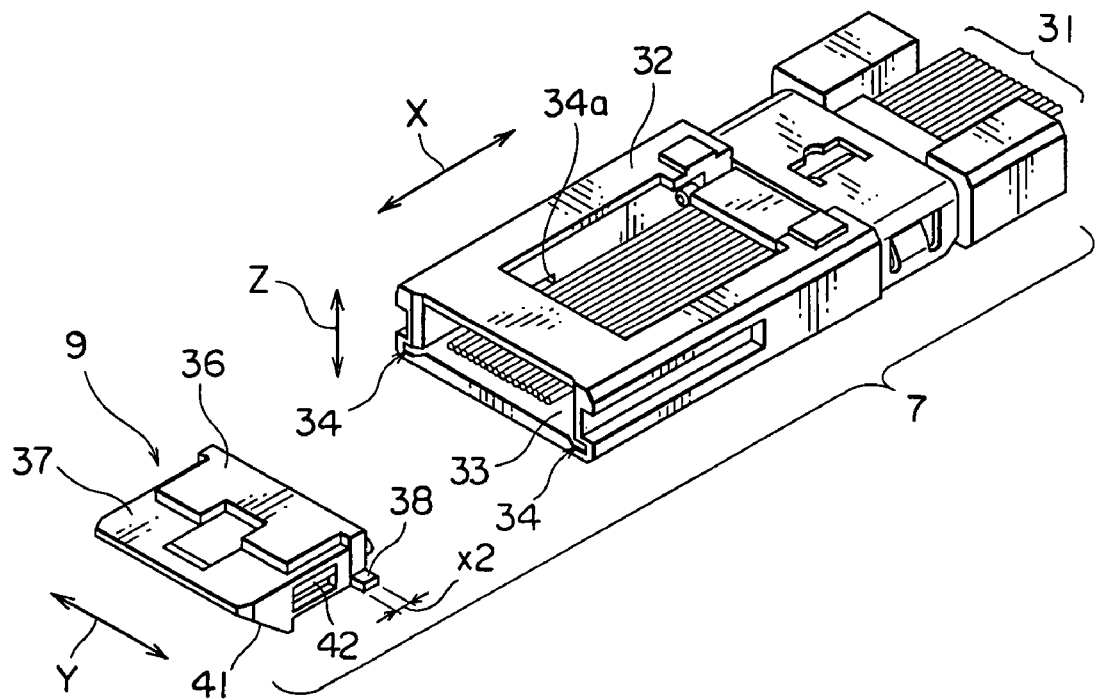
FIG. 3A is an exploded perspective view of a plug-side optical connector contained in the optical connector apparatus illustrated in FIG. 1.
Figure 3B:
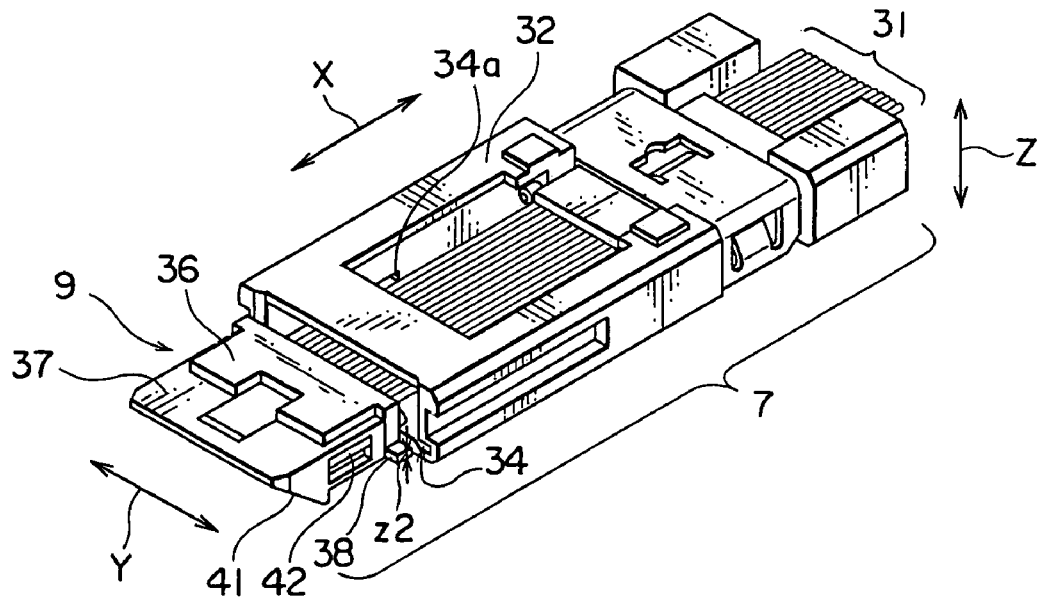
FIG. 3B is a perspective view showing a half-assembled state of the plug-side optical connector in FIG. 3A.

Referring to FIGS. 3A and 3B in addition to FIG. 1, the plug-side connector 7 will be described.

The plug-side connector 7 comprises a connector body 32 of a rectangular tubular shape. A number of optical fibers 31 as optical transmission lines are received in the connector body 32 in a parallel arrangement. The connector body 32 has an opening portion 33 having a rectangular section and formed at its one end in the axial direction X to receive the light shielding device 9. The connector body 32 has a pair of grooves or recesses 34 formed at opposite ends of the opening portion 33 in the widthwise direction Y, respectively. Each of the grooves 34 extends from the one end of the connector body 32 in the axial direction X at one end of the opening portion 33 in the thickness direction Z and is terminated at an intermediate position of the connector body 32 to form a licking portion 34a.

The plug-side light shielding device 9 comprises a light shielding device body 36 fitted and inserted into the opening portion 33 of the connector body 32 in the axial direction X (which is referred here to as a second coupling direction) and held so as to be movable only in the axial direction X, and a shutter or a light shielding member 37 held by the light shielding device body 36 so as to be slidable only in a radial direction, more particularly, the thickness direction Z. The light shielding device body 36 has a pair of rectangular protrusions 38 as guide portions formed at opposite ends in the widthwise direction Y, respectively, to be inserted into the grooves 34 in one-to-one correspondence. Each of the protrusions 38 has a small dimension in the axial direction X and therefore serves as a guide for smoothing the movement of the light shielding device body 36.

The grooves 34 and the protrusions 38 are formed at positions biased to one side in the thickness direction Z. Therefore, orientation of the plug-side light shielding device 9 with respect to the connector body 32 is uniquely determined. Thus, the plug-side connector 7 can not be assembled if orientation of the plug-side light shielding device 9 with respect to the connector body 32 is improper. In the light shielding device body 36, it is unnecessary to provide the above-mentioned aligning mechanism.

In the axial direction X, the protrusion 38 has a dimension x2 significantly smaller than that of the groove 34. In the thickness direction Z, the protrusion 38 has a dimension z2 slightly smaller than that of the groove 34.

Further, the dimensions x1 and x2 are selected so that x2<x1. Therefore, the plug-side light shielding device 9 can not be coupled to the connector body 12 of the jack-side connector 4 in FIGS. 2A and 2B. Likewise, the jack-side light shielding device 6 in FIGS. 2A and 2B can not be coupled to the connector body 32 of the plug-side connector 7. Thus, since the protrusions 18 and 38 are different in length from each other, there is a less possibility of occurrence of an assembling error.

The dimensions z1 and z2 are selected so that z2≧z1. By selecting the dimensions z1 and z2 so that z2≧z1, it is possible to prevent the plug-side light shielding device 9 from being coupled to the connector body 12 of the jack-side connector 4 in FIGS. 2A and 2B.

The light shielding member 37 has a slant surface 41 formed at its end in the axial direction X. The slant surface 41 is inclined to have predetermined angles with respect to the axial direction X and the thickness direction Z. Therefore, if a force in the axial direction X is applied to the slant surface 41 in the states illustrated in FIGS. 3A and 3B, the light shielding member 37 is moved in the thickness direction Z due to a component force thereof. A movable range of the light shielding member 37 is restricted by opposite protrusions 42 of the light shielding device body 36.

Figure 4:
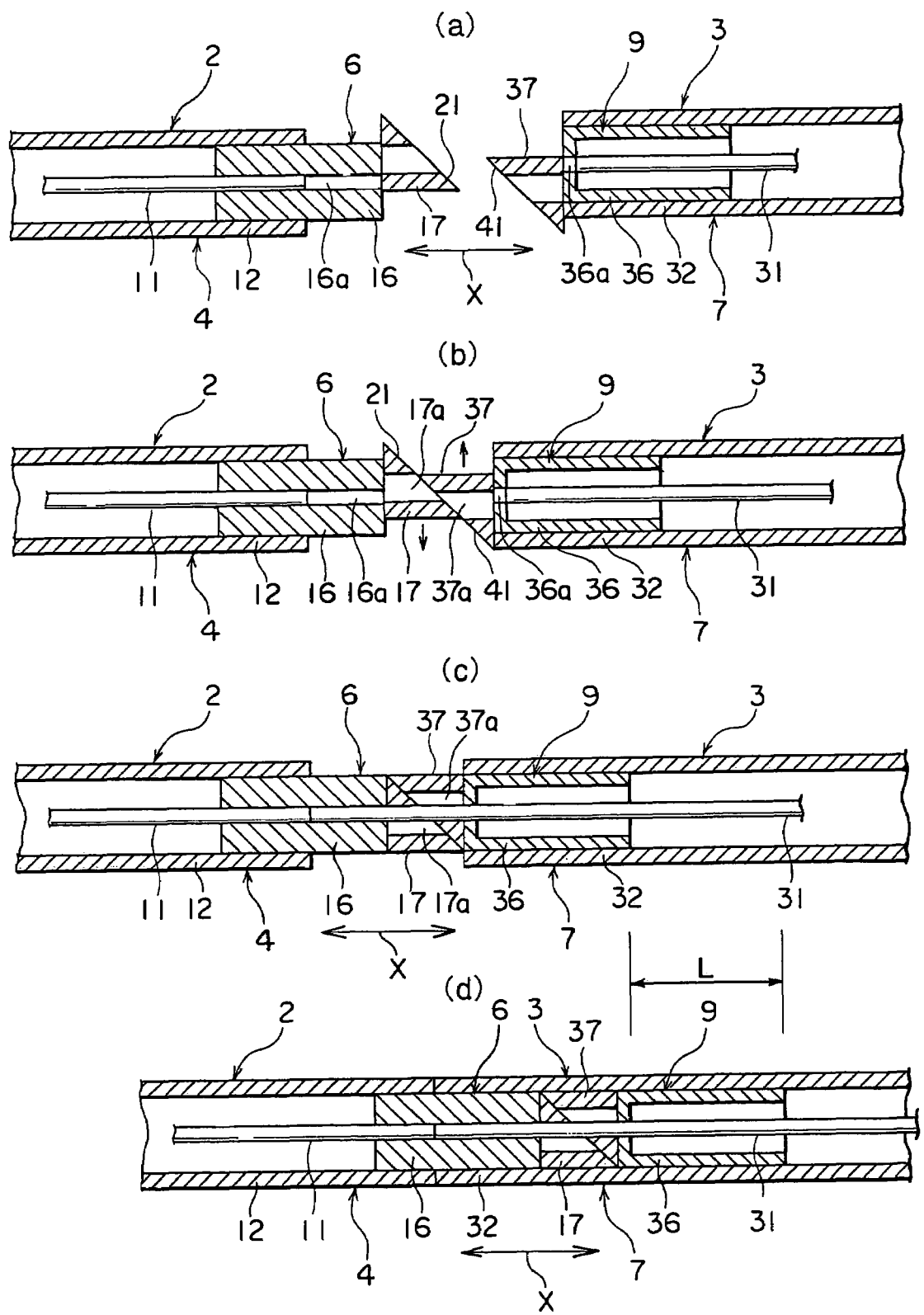
FIG. 4 is a schematic diagram for describing an action during a connecting operation of the optical connector apparatus in FIG. 1.

Referring to FIG. 4, description will be made of an action during a connecting operation of the optical connector apparatus in FIG. 1.

In FIG. 4, (a) shows a state before the jack-side connector 2 and the plug-side connector 3 are connected to each other. The jack-side connector 2 and the plug-side connector 3 are aligned on a single axis with the light shielding members 17 and 37 faced to and spaced from each other in the axial direction X. In this state, the light shielding members 17 and 37 cover through holes 16a and 36a of the light shielding device bodies 16 and 36 of the light shielding devices 6 and 9 to shield plural optical paths extending between the jack-side connector 2 and the plug-side connector 3.

The optical fibers 11 are inserted into the through hole [holes] 16a of the light shielding device body 16 of the jack-side light shielding device 6 to an approximate half position in the axial direction X to be aligned. As a consequence, the through holes 16a of the light shielding device body 16 of the jack-side light shielding device 6 serve as the above-mentioned aligning mechanism. Therefore, the light shielding device body 16 may be called an aligning member.

It is noted here that the through holes 36a of the light shielding device body 36 of the plug-side light shielding device 9 do not serve as the above-mentioned aligning mechanism.

The light shielding members 17 and 37 are urged by urging means (not shown) in directions opposite to each other with respect to the light shielding device bodies 16 and 36. Thus, the light shielding members 17 and 37 are located at illustrated positions and cover the through holes 16a and 36a.

In FIG. 4, (b) shows a state where the jack-side connector 2 and the plug-side connector 3 approach each other and the slant surfaces 21 and 41 of the light shielding members 17 and 37 are brought into contact with each other in the axial direction X. When the jack-side connector 2 and the plug-side connector 3 further approach each other, the light shielding members 17 and 37 are applied with a contacting force. Due to a component force of the contacting force, the light shielding member 17 of the jack-side connector 2 slides downward while the light shielding member 37 of the plug-side connector 37 slides upward.

In FIG. 4, (c) shows a state where the light shielding member 17 reaches a maximum descending position or a lowermost position and the light shielding member 37 reaches a maximum ascending position or an uppermost position. In this state, sliding movement of the light shielding members 17 and 37 is stopped. At this time, through holes 17a and 37a respectively formed in the light shielding members 17 and 37 communicate with the through holes 16a and 36a of the light shielding device bodies 16 and 36 to form communication holes parallel to one another on a single plane which extends in the axial direction X and the widthwise direction Y Thus, the optical path is opened. Then, the optical fibers 31 are inserted into the communication holes and aligned so as to be brought into contact with the optical fibers 11 in the through holes 16a of the light shielding device body 16 in one-to-one correspondence.

In the state illustrated in FIG. 4(c) where the optical fibers 11 and 31 are brought into contact with each other, the connector body 32 of the plug-side connector 3 is slid by a dimension L in the axial direction X to be brought into contact with the connector body 12 of the jack-side connector 2.

In FIG. 4, (d) shows a state where the connector body 32 of the plug-side connector 3 is slid and brought into contact with the connector body 12 of the jack-side connector 2. In this state, optical connection between the optical fibers 11 and 31 is established.

The optical fibers 11 and 13 have contacting portions located in each through hole 16a of the light shielding device body 16. The connector bodies 12 and 32 have contacting portions located on an outer peripheral surface of the light shielding device body 16. These contacting portions are substantially coplanar on one plane perpendicular to the axial direction X. The light shielding members 17 and 37 are located inside the connector body 32 of the plug-side connector 3. The jack-side light shielding device 6 is substantially fixed with respect to the connector body 12 while the plug-side light shielding device 9 is slidable with respect to the connector body 32.

Figure 5A:
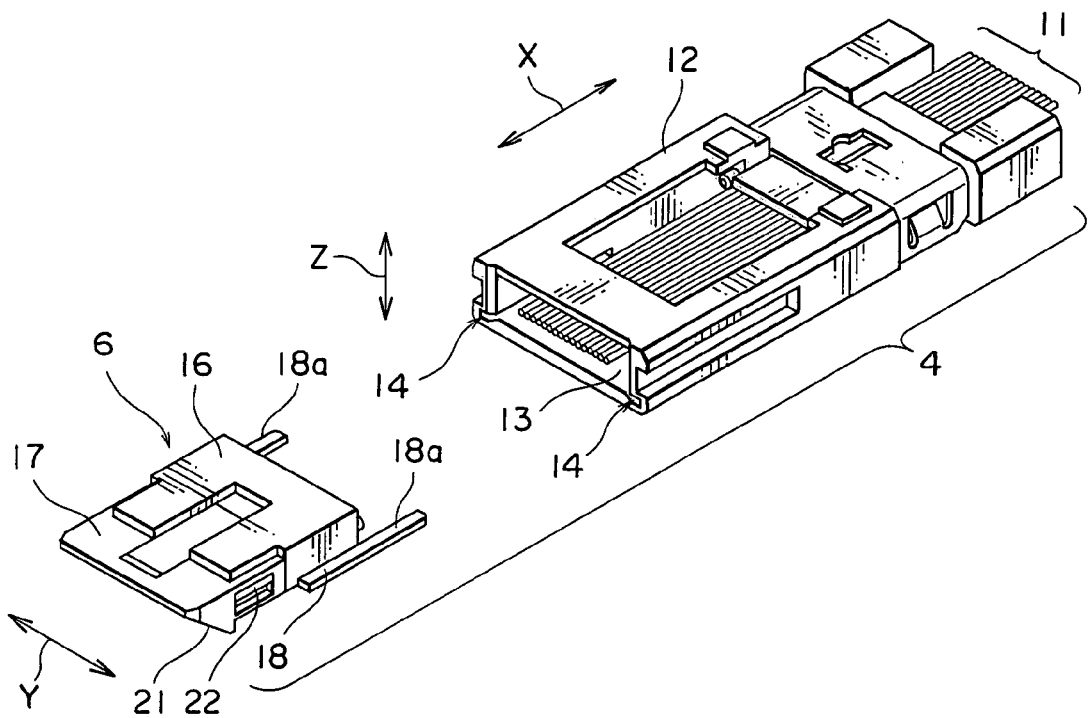
FIG. 5A is an exploded perspective view of a modification of the jack-side optical connector.
Figure 5B:
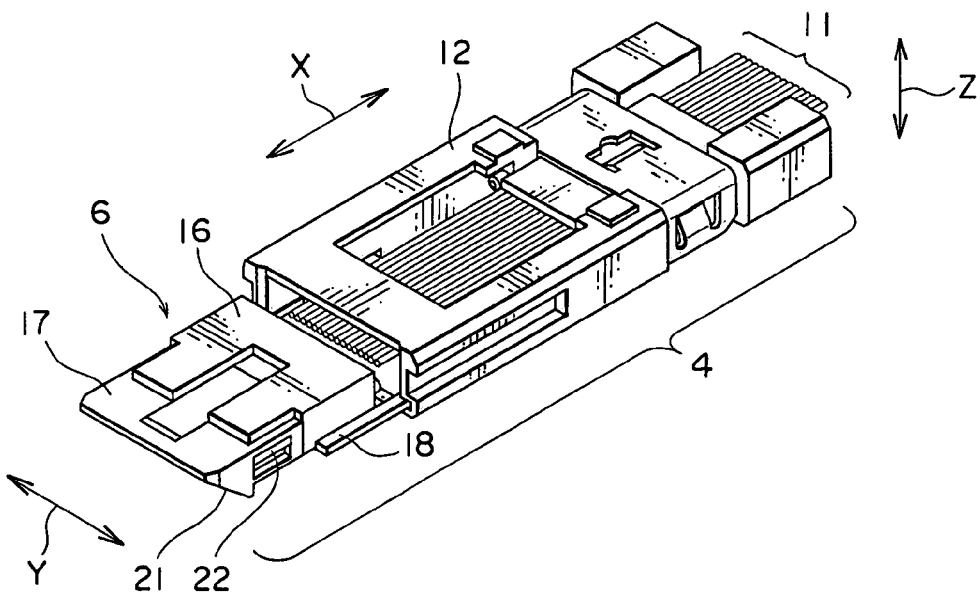
FIG. 5B is a perspective view showing a half-assembled state of the modification in FIG. 5A.

Referring to FIGS. 5A and 5B, a modification of the jack-side connector will be described. Similar parts to those of the jack-side connector 4 in FIGS. 2A and 2B are designated by like reference numerals and description thereof will be omitted.

In FIGS. 5A and 5B, the protrusion 18 of the jack-side connector 4 has an extended portion 18a protruding from an end face of the light shielding device body 16 in the axial direction X. Thus, in case of the protrusion 18 in FIGS. 5A and 5B, a dimension in the axial direction X is as large as about twice that of the protrusion illustrated in FIGS. 2A and 2B.

With this structure, the protrusion 18 is successfully guided by the groove 14 when the light shielding device 6 is coupled to the connector body 12 of the jack-side optical connector 4. Therefore, production of the jack-side optical connector is more facilitated.

Although this invention has been described in conjunction with the preferred embodiment thereof, this invention may be modified in various other manners within the scope of the appended claims.

What is claimed is:

1. An optical connector apparatus comprising a first and a second optical connector which are optically connectable to each other,
   the first optical connector comprising:
   a first connector body;
   a first light shielding device fitted to the first connector body in a first fitting direction; and
   a first guide portion coupled to the first light shielding device to guide fitting of the first light shielding device to the first connector body, the first guide portion having a first dimension in the first fitting direction,
   the second optical connector comprising:
   a second connector body;
   a second light shielding device fitted to the second connector body in a second fitting direction; and
   a second guide portion coupled to the second light shielding device to guide fitting of the second light shielding device to the second connector body, the second guide portion having a second dimension in the second fitting direction, the second dimension being determined greater than the first dimension.

2. The optical connector apparatus according to claim 1, wherein the second guide portion has a dimension in a direction perpendicular to the fitting direction which is not smaller than that of the first guide portion.

3. The optical connector apparatus according to claim 1, wherein the first and the second guide portions comprise protrusions protruding from the first and the second light shielding devices, respectively, the first and the second connector bodies having grooves for receiving and guiding the protrusions, respectively.

4. The optical connector apparatus according to claim 1, wherein the second light shielding device is slidable in the fitting direction with respect to the second connector body, the first and the second light shielding devices being brought into contact with each other in the fitting direction and the second light shielding device is forced into the second connector body by the first light shielding device when the first and the second optical connectors are optically connected to each other.

5. The optical connector apparatus according to claim 4, wherein a part of the first light shielding device is inserted into the second connector body in addition to the second light shielding device upon completion of connection between the first and the second optical connectors.

6. The optical connector apparatus according to claim 4, wherein the second connector body has a locking portion adapted to be engaged with the second guide portion to inhibit movement of the second light shielding device.

7. The optical connector apparatus according to claim 1, wherein the first and the second light shielding devices comprise first and second light shielding device bodies fitted to the first and the second connector bodies, respectively, the first and the second guide portions being coupled to the first and the second light shielding device bodies, respectively.

8. The optical connector apparatus according to claim 7, wherein the first and the second light shielding devices comprise first and second light shielding members movable in a direction perpendicular to the fitting direction with respect to the first and the second light shielding device bodies, respectively, the first and the second optical connectors having optical paths opened and closed by movement of the first and the second light shielding members, respectively.

9. The optical connector apparatus according to claim 8, wherein the first and the second light shielding members have slant surfaces adapted to be brought into contact with each other when the first and the second optical connectors are optically connected to each other, respectively, the first and the second light shielding members being moved by a component force of a contacting force acting upon the slant surfaces.

10. The optical connector apparatus according to claim 9, wherein the first and the second light shielding members have movable ranges restricted by the first and the second light shielding device bodies, respectively.

11. The optical connector apparatus according to claim 1, further comprising a connecting adapter of a tubular shape, the first and the second optical connectors being fitted to opposite ends of the connecting adapter, the first and the second light shielding devices being brought into contact with each other inside the connecting adapter.

12. An optical connector comprising:
a connector body having an opening portion which defines an axial direction and has a rectangular section; and
a light shielding device coupled to the connector body, the light shielding device comprising:
a light shielding device body inserted into the opening portion;
a light shielding member engaged with the light shielding device body and movable in a radial direction perpendicular to the axial direction to open and close an optical path; and
a guide portion coupled to the light shielding device body to be guided by the connector body,
the connector body having a groove formed on an inner surface of the opening portion at a biased position in the radial direction to receive the guide portion.

13. The optical connector according to claim 12, wherein the guide portion comprises a protrusion protruding from the light shielding device body.

14. The optical connector according to claim 12, wherein the light shielding device body is slidable in the axial direction with respect to the connector body and is forced into the connector body by a mating optical connector.

15. The optical connector according to claim 14, wherein the connector body has a locking portion to be engaged with the guide portion to inhibit movement of the light shielding device body.

16. The optical connector according to claim 14, wherein the light shielding member has a slant surface to be brought into contact with the mating optical connector, the light shielding member being moved in the radial direction by a component force of a contacting force acting upon the slant surface.

17. The optical connector according to claim 16, wherein the first and the second light shielding members have movable ranges restricted by the first and the second light shielding device bodies.

* * * * *